(12) United States Patent
Sasaki et al.

(10) Patent No.: US 11,834,100 B2
(45) Date of Patent: Dec. 5, 2023

(54) ELECTRIC VEHICLE

(71) Applicants: TOYOTA JIDOSHA KABUSHIKI KAISHA, Toyota (JP); SUBARU CORPORATION, Tokyo (JP)

(72) Inventors: Akihito Sasaki, Toyota (JP); Yuuki Mukaigawa, Seto (JP); Tatsuya Narahara, Shibuya-ku (JP)

(73) Assignees: TOYOTA JIDOSHA KABUSHIKI KAISHA;, Toyota (JP); SUBARU CORPORATION, Tokyo (JP)

( * ) Notice: Subject to any disclaimer, the term of this patent is extended or adjusted under 35 U.S.C. 154(b) by 430 days.

(21) Appl. No.: 17/196,237

(22) Filed: Mar. 9, 2021

(65) Prior Publication Data

US 2021/0323609 A1 Oct. 21, 2021

(30) Foreign Application Priority Data

Apr. 20, 2020 (JP) ................. 2020-074925

(51) Int. Cl.
*B62D 21/15* (2006.01)
*B60K 1/04* (2019.01)
*B62D 25/20* (2006.01)

(52) U.S. Cl.
CPC .............. *B62D 21/157* (2013.01); *B60K 1/04* (2013.01); *B62D 25/20* (2013.01); *B60K 2001/0438* (2013.01)

(58) Field of Classification Search
CPC ........ B62D 21/157; B62D 25/20; B60K 1/04; B60K 2001/0438; B60Y 2306/01; B60L 3/0007
See application file for complete search history.

(56) References Cited

U.S. PATENT DOCUMENTS

| | | | |
|---|---|---|---|
| 2014/0182958 A1* | 7/2014 | Rawlinson | B60L 50/66 180/68.5 |
| 2017/0313170 A1* | 11/2017 | Hara | B60L 50/66 |
| 2019/0393459 A1* | 12/2019 | Wesche | H01M 50/242 |
| 2019/0393460 A1* | 12/2019 | Wesche | H01M 50/271 |

FOREIGN PATENT DOCUMENTS

| | | |
|---|---|---|
| CN | 107415671 A | 12/2017 |
| CN | 10635077 A | 12/2019 |
| JP | 2017-193299 A | 10/2017 |
| JP | 2019-188857 A | 10/2019 |

* cited by examiner

*Primary Examiner* — James A English
(74) *Attorney, Agent, or Firm* — Oliff PLC

(57) ABSTRACT

An electric vehicle may include: a floor panel; and a battery pack located below the floor panel. the battery pack may include: a bottom plate; a plurality of battery stacks distributed on the bottom plate along a longitudinal direction of the electric vehicle with an interval provided between the battery stacks; a battery crossmember located between the battery stacks; a plurality of end plates each of which is fixed to a side surface of corresponding one of the battery stacks; a first load transmitting component extending from the battery crossmember to a position located higher than upper surfaces of the battery stacks; and a second load transmitting component located outward of the first load transmitting component in the width direction. The second load transmitting component may be a component extending to a position higher than the upper surfaces of the battery stacks.

3 Claims, 9 Drawing Sheets

ELECTRIC VEHICLE

CROSS-REFERENCE TO RELATED APPLICATION(S)

This application claims priority to Japanese Patent Application No. 2020-074925 filed on Apr. 20, 2020, the contents of which are hereby incorporated by reference into the present application.

TECHNICAL FIELD

The art disclosed herein relates to an electric vehicle. In the disclosure herein, an electric vehicle refers to a vehicle configured to travel by electric power stored in a battery. The electric vehicle includes for example an electric motor vehicle, a hybrid vehicle, and a fuel cell vehicle.

Japanese Patent Application Publication No. 2019-188857 describes a battery pack mounted on a vehicle. This battery pack has a transmitting component between a frame component and battery stacks. According to this configuration, rigidity of the vehicle against collision to a side surface of the vehicle (hereinbelow termed "lateral collision") is increased.

SUMMARY

When a side portion (such as a pillar) of a body of a vehicle is pushed toward the vehicle center upon lateral collision, a floor panel deforms and warps downward. In an electric vehicle having a battery pack located below a floor panel, the floor panel comes into contact with the battery pack by such downward deformation of the floor panel. When a load is applied to battery stacks inside the battery pack by the deformation of the floor panel, the battery stacks may be damaged. In view of this, the disclosure herein proposes art configured to reduce a load applied to battery stacks when a floor panel deforms downward by lateral collision.

An electric vehicle disclosed herein may comprise: a floor panel; and a battery pack located below the floor panel, wherein the battery pack may comprise: a bottom plate; a plurality of battery stacks distributed on the bottom plate along a longitudinal direction of the electric vehicle with an interval provided between the battery stacks; a battery crossmember protruding upward from the bottom plate, extending along a width direction of the electric vehicle, and located between the battery stacks; a plurality of end plates each of which is fixed to an outer side surface of corresponding one of the battery stacks, the outer side surface facing outward in the width direction; a first load transmitting component extending from the battery crossmember to a position located higher than upper surfaces of the battery stacks; and a second load transmitting component located outward of the first load transmitting component in the width direction, wherein the second load transmitting component may be a component extending from the battery crossmember to a position higher than the upper surfaces of the battery stacks or a component extending from at least one of the end plates to a position higher than the upper surfaces of the battery stacks.

In this electric vehicle, upper ends of the first and second load transmitting components are located higher than the respective upper surfaces of the battery stacks. Thus, when the floor panel deforms downward by lateral collision, loads are applied to the first and second load transmitting components. The load applied to the first load transmitting component is received by the battery crossmember. The load applied to the second load transmitting component is received by the battery crossmember or the at least one of the end plates. Due to this, transmission of the loads applied to the first and second load transmitting components to the respective battery stacks can be mitigated. Further, by supporting the floor panel at two positions in the width direction (that is, by the first load transmitting component and by the second load transmitting component), application of a load from the floor panel to the battery stacks can be mitigated. Due to this, breakage of the battery packs can be prevented.

DETAILED DESCRIPTION

Some of the technical elements of the electric vehicle described herein will be listed. It should be noted that the respective technical elements are independent of one another, and are useful solely or in combinations.

In an aspect of the electric vehicle disclosed herein, the body may further comprise a floor crossmember extending upward from the floor panel and extending along the width direction. At least one of the first load transmitting component or the second load transmitting component may be located below the floor crossmember.

In the electric vehicle having the floor crossmember, there is a case in which the floor panel deforms downward together with the floor crossmember. In this case, an especially large load is applied to the battery pack located below the floor crossmember. When at least one of the first load transmitting component or the second load transmitting component is located below the floor crossmember, the large load applied to the battery pack can be received by the at least one of the first load transmitting component or the second load transmitting component. Due to this, application of such a large load to the battery stacks can be mitigated.

In an aspect of the electric vehicle disclosed herein, the electric vehicle may further comprise a wiring connected to at least one of the battery stacks. The second load transmitting component may be the component extending from at least one of the end plates to a position higher than the upper surfaces of the battery stacks. The wiring may be located on the battery crossmember and outward of the first load transmitting component in the width direction.

In this configuration, even when the second load transmitting component cannot be provided at a certain position on the battery crossmember since the wirings located outward of the first load transmitting component in the width direction are provided at this certain position, the second load transmitting component can still be provided on at least one of the end plates.

In an aspect of the electric vehicle disclosed herein, the first load transmitting component may comprise a tapered shape in which a width of the first load transmitting component in the width direction narrows toward an upper end of the first load transmitting component.

According to this configuration, the first load transmitting component can be prevented from bending, and the load can be received by the first load transmitting component with more certainty.

Figure 1:
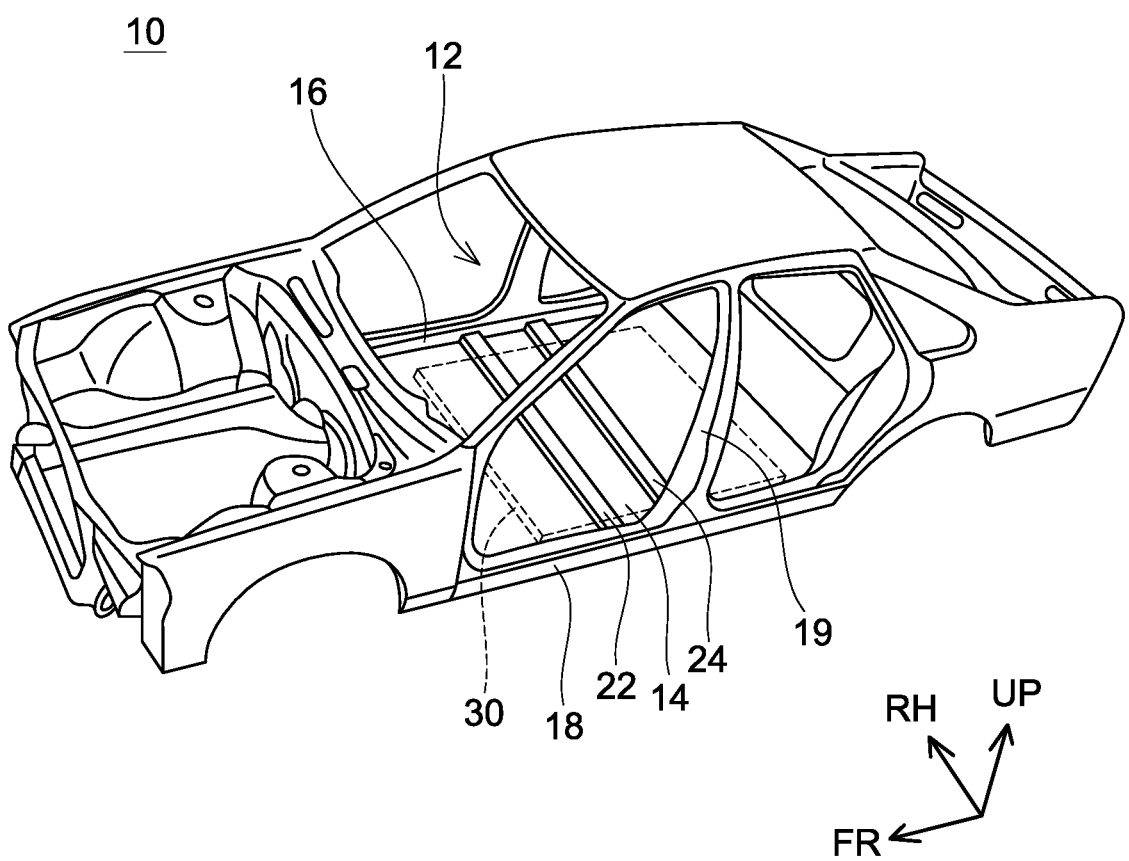
FIG. 1 shows a perspective view of a body of an electric vehicle.
Figure 2:
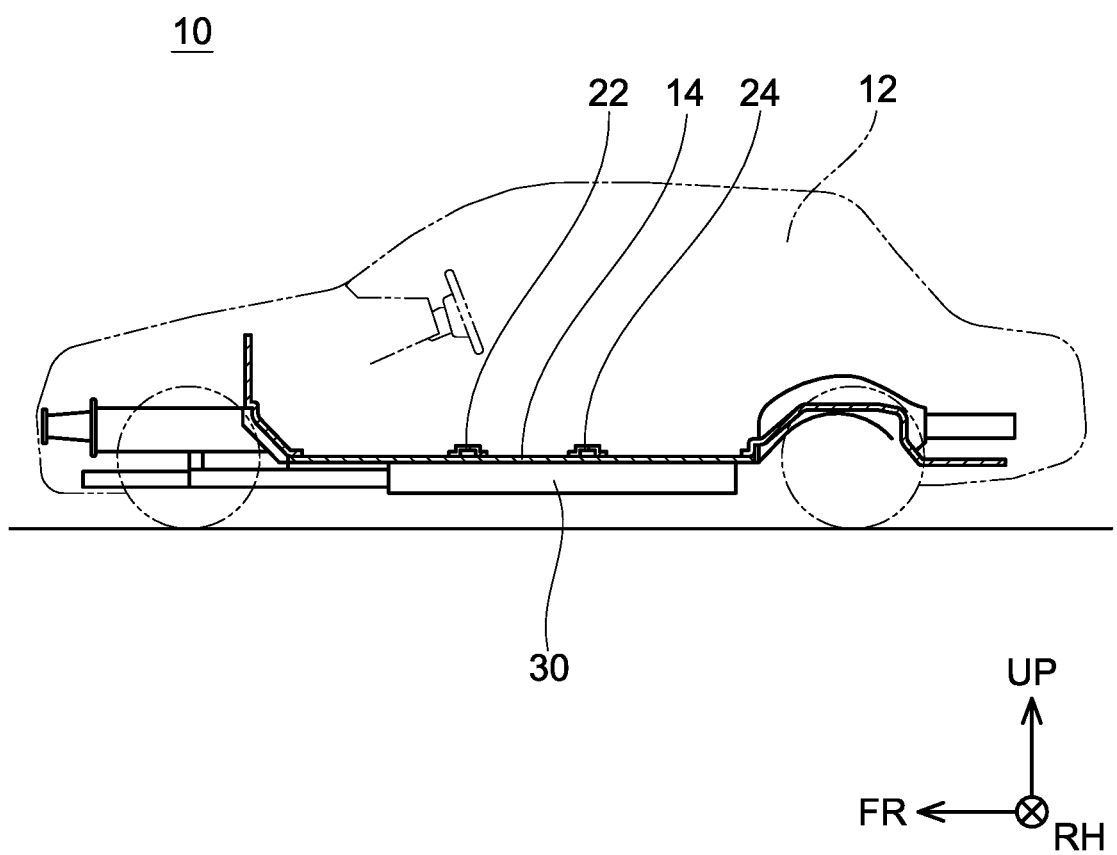
FIG. 2 shows a side view of the electric vehicle.

An electric vehicle 10 of an embodiment shown in FIGS. 1 and 2 has a floor panel 14 that constitutes a floor of a vehicle cabin 12. A battery pack 30 is disposed below the floor panel 14. The battery pack 30 is configured to supply electric power to a motor that is not shown. The electric vehicle 10 travels by this motor rotating wheels of the electric vehicle 10. In the drawings including FIGS. 1 and 2, an arrow FR indicates a frontward direction of the vehicle, an arrow RH indicates a rightward direction of the vehicle, and an arrow UP indicates an upward direction of the vehicle.

Figure 3:
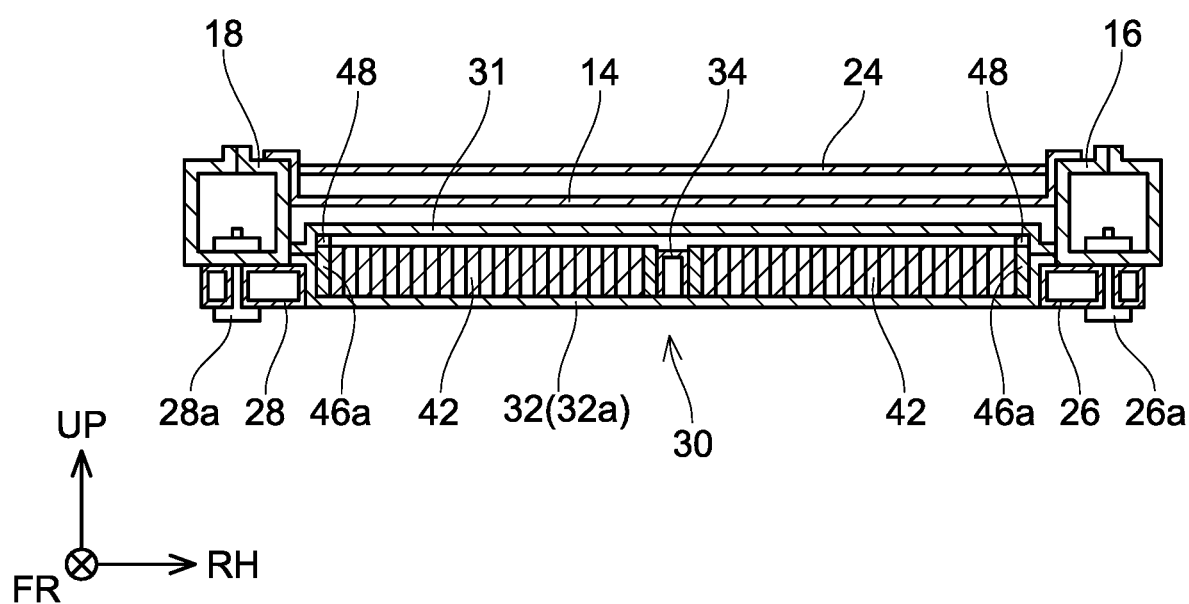
FIG. 3 shows a cross-sectional view of a floor panel and a battery pack along a width direction of the electric vehicle (a cross-sectional view at a position of a floor crossmember 24)

FIG. 3 is a cross-sectional view of the floor panel 14 and the battery pack 30 along a width direction of the vehicle. As shown in FIG. 3, a rocker 16 is provided at a right edge of the floor panel 14. As shown in FIG. 1, the rocker 16 extends long along the right edge of the floor panel 14 in a longitudinal direction of the vehicle. The rocker 16 is fixed to the floor panel 14 by, for example, welding. As shown in FIG. 3, a rocker 18 is provided at a left edge of the floor panel 14. As shown in FIG. 1, the rocker 18 extends long along the left edge of the floor panel 14 in the longitudinal direction of the vehicle. The rocker 18 is fixed to the floor panel 14 by, for example, welding.

As shown in FIGS. 1 and 2, floor crossmembers 22, 24 are disposed on the floor panel 14. The floor crossmembers 22, 24 each protrude upward from the floor panel 14. The floor crossmembers 22, 24 are fixed to the floor panel 14 by, for example, welding. The floor crossmember 22 extends long along the width direction of the vehicle. A right end of the floor crossmember 22 is connected to the rocker 16. A left end of the floor crossmember 22 is connected to the rocker 18. The floor crossmember 24 is disposed rearward of the floor crossmember 22. The floor crossmember 24 extends long along the width direction of the vehicle. A right end of the floor crossmember 24 is connected to the rocker 16. A left end of the floor crossmember 24 is connected to the rocker 18.

As shown in FIG. 3, the battery pack 30 is located below the floor panel 14. An attachment component 26 is provided at a right edge of the battery pack 30. The attachment component 26 extends long along the right edge of the battery pack 30 in the longitudinal direction of the vehicle. The attachment component 26 is fixed to the battery pack 30 by bolts that are not shown. The attachment component 26 is located below the rocker 16. The attachment component 26 is fixed to the rocker 16 by bolts 26a. The battery pack 30 is fixed to the floor panel 14 via the attachment component 26 and the rocker 16. An attachment component 28 is provided at a left edge of the battery pack 30. The attachment component 28 extends long along the left edge of the battery pack 30 in the longitudinal direction of the vehicle. The attachment component 28 is fixed to the battery pack 30 by bolts that are not shown. The attachment component 28 is located below the rocker 18. The attachment component 28 is fixed to the rocker 18 by bolts 28a. The battery pack 30 is fixed to the floor panel 14 via the attachment component 28 and the rocker 18.

Figure 4:
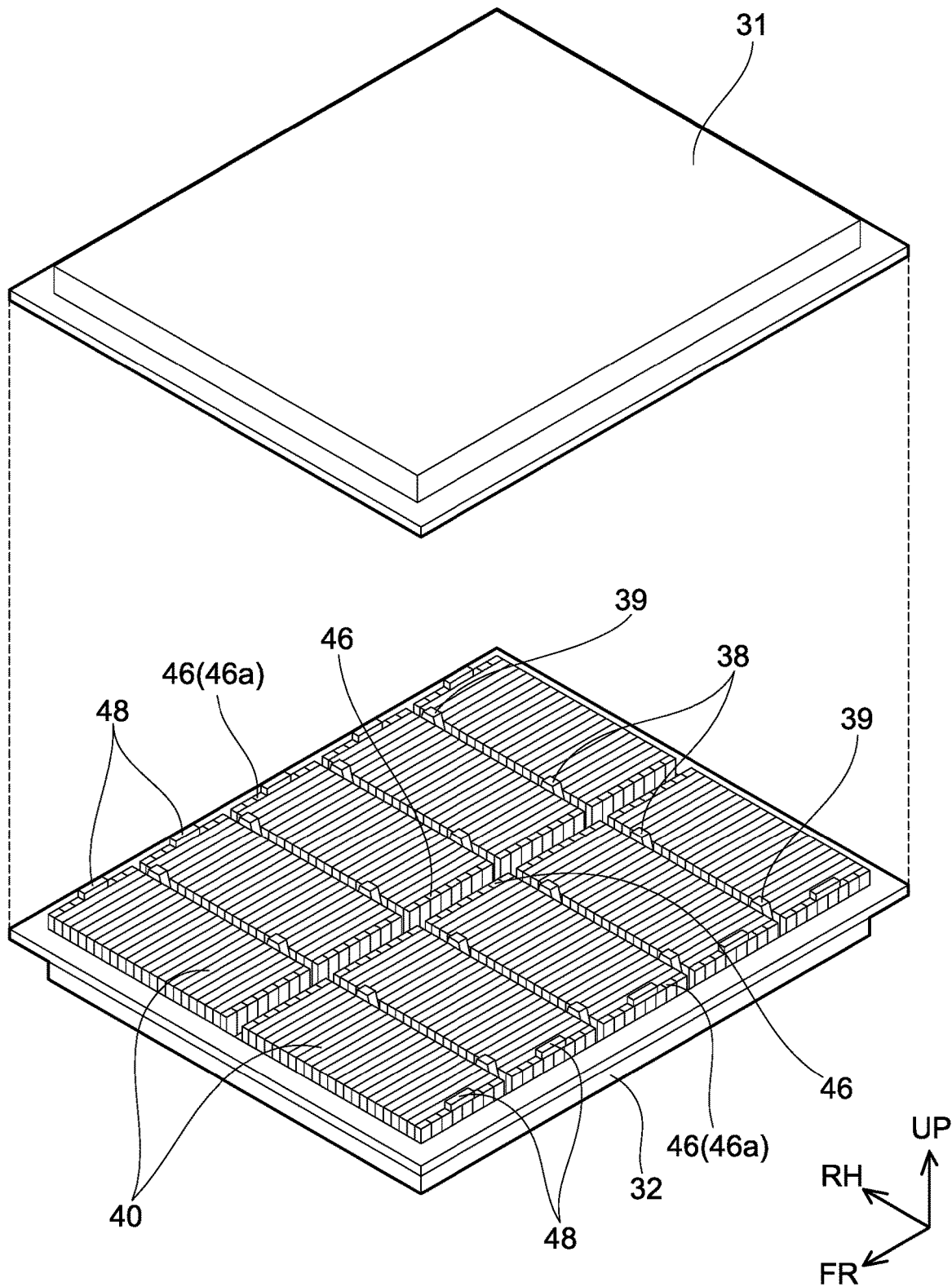
FIG. 4 shows a disassembled perspective view of the battery pack.
Figure 5:
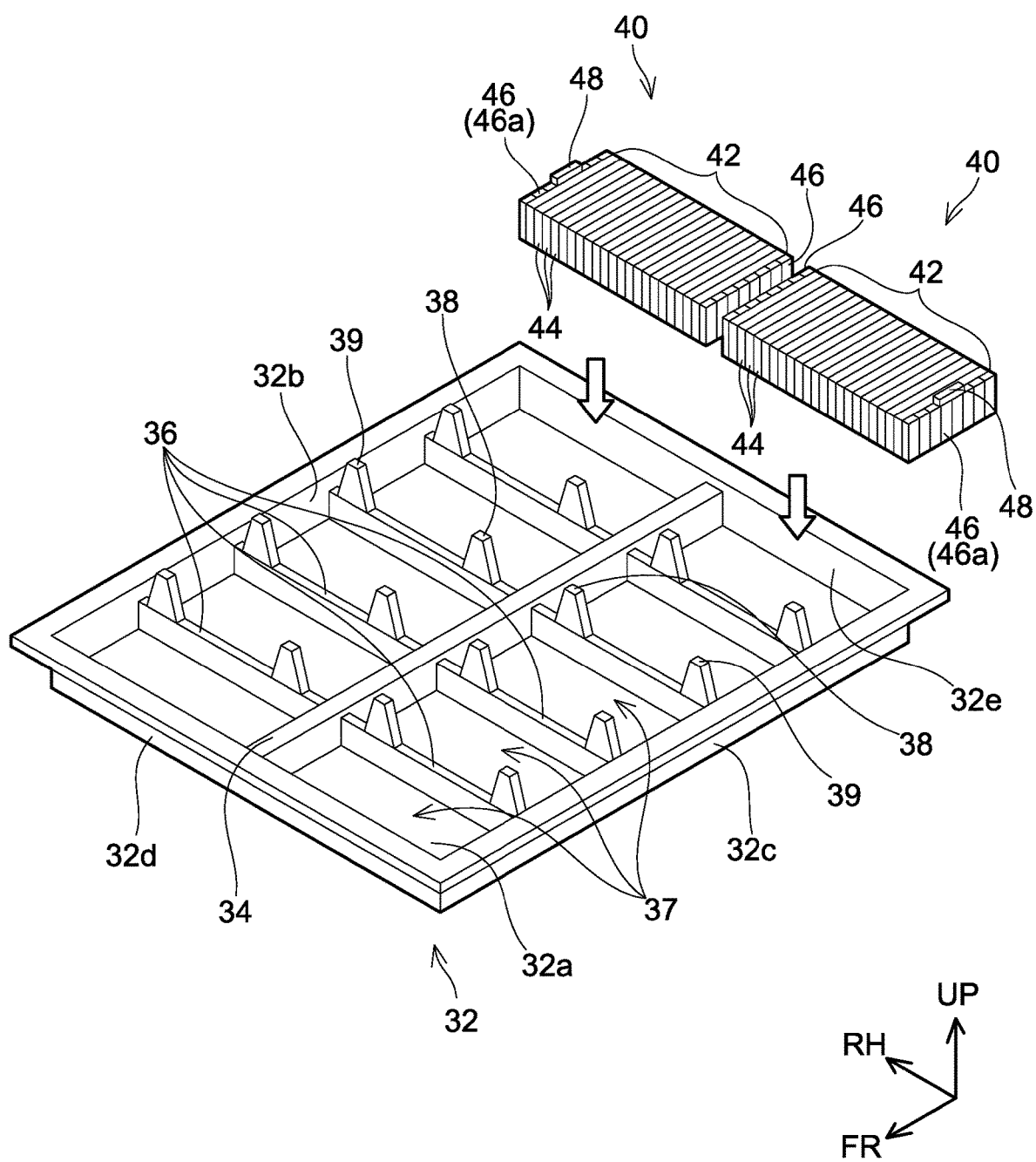
FIG. 5 shows a perspective view of a tray and battery modules of the battery pack.

As shown in FIG. 4, the battery pack 30 includes a cover 31 and a tray 32. The cover 31 covers an upper portion of the tray 32. A plurality of battery modules 40 is housed inside the battery pack 30. As shown in FIG. 5, each of the battery modules 40 includes a battery stack 42 and two end plates 46. The battery stack 42 is a stack component in which a plurality of battery cells 44 is stacked. Each of the end plates 46 is a resin plate, and has a relatively high rigidity. The end plates 46 are respectively fixed to ends of their corresponding battery stack 42. That is, each battery stack 42 is interposed between its two end plates 46. An upper surface of each of the end plates 46 is located substantially at the same height as an upper surface of each of the battery stacks 42.

As shown in FIG. 5, the tray 32 includes a bottom plate 32a and four side plates 32b to 32e. The side plates 32b to 32e are arranged to surround four edges of the bottom plate 32a. As such, the tray 32 has a cup shape. A battery center member 34 is disposed inside the tray 32 at a center portion in the width direction. The battery center member 34 protrudes upward from the bottom plate 32a. The battery center member 34 is fixed to the bottom plate 32a. The battery center member 34 extends long in the longitudinal direction of the vehicle. A front end of the battery center member 34 is connected to the side plate 32d on a front side. A rear end of the battery center member 34 is connected to the side plate 32e on a rear side.

A plurality of battery crossmembers 36 is disposed inside the tray 32. Each of the battery crossmembers 36 protrudes upward from the bottom plate 32a. An upper surface of each of the battery crossmembers 36 is located lower than the upper surface of each of the battery stacks 42. Each of the battery crossmembers 36 is fixed to the bottom plate 32a. Each of the battery crossmembers 36 extends long in the width direction of the vehicle. Each of the battery crossmembers 36 is located between the side plate 32b on a right side and the battery center member 34 or located between the side plate 32c on a left side and the battery center member 34. One end of each of the battery crossmembers 36 (an end located proximate to the center of the battery pack 30 in the width direction) is connected to the battery center member 34. Another end of each of the battery crossmembers 36 is connected to the side plate 32b or the side plate 32c. The inside of the tray 32 is partitioned into ten areas 37 by the battery center member 34 and the plurality of battery crossmembers 36. As shown in FIG. 4, each of the battery modules 40 is housed in its corresponding area 37. Due to this, two battery modules 40 are arranged along the width direction of the vehicle and five battery modules 40 are arranged along the longitudinal direction of the vehicle within the tray 32. As such, the battery crossmembers 36 are disposed in respective intervals between the five modules 40 arranged along the longitudinal direction of the vehicle. That is, each of the battery crossmembers 36 is located between the battery modules 40 that are arranged along the longitudinal direction of the vehicle. A lower surface of each of the end plates 46 is in contact with the bottom plate 32a. The battery modules 40 are respectively housed within the areas 37 such that a direction along which the battery cells 44 are stacked matches the width direction of the vehicle. Accordingly, each of the end plates 46 is arranged at a position adjacent to one of the side plate 32b, the side plate 32c, or the battery center member 34. Hereinbelow, the end plates 46 that are adjacent to the side plates 32b, 32c are termed end plates 46a.

As shown in FIGS. 4 and 5, a load transmitting component 48 is disposed at an upper portion of each of the end plates 46a adjacent to the side plates 32b, 32c. Each of the load transmitting components 48 extends upward from its corresponding end plate 46a that is located below. Each of the load transmitting components 48 is fixed to its corresponding end plate 46a that is located below. Each of the load transmitting components 48 may be integrated with its corresponding end plate 46a that is located below. An upper end of each of the load transmitting components 48 is located higher than the upper surfaces of the battery packs 42. As shown in FIG. 3, the upper end of each of the load transmitting components 48 is located in a vicinity of the cover 31. A clearance may be provided between the upper ends of the respective load transmitting components 48 and the cover 31, or the upper ends of the respective load transmitting components 48 may be in contact with the cover 31.

Figure 6:
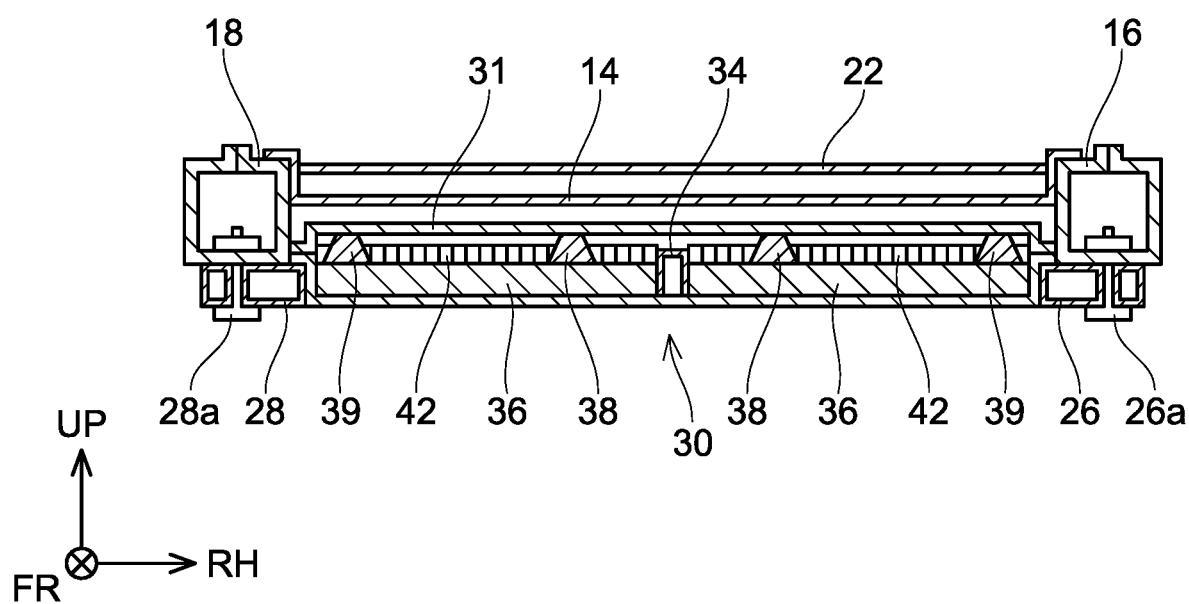
FIG. 6 shows a cross-sectional view of the floor panel and the battery pack along the width direction (a cross-sectional view at a position of a floor crossmember 22)

As shown in FIGS. 4 and 5, load transmitting components 38, 39 are arranged at an upper portion of each of the battery crossmembers 36. Each of the load transmitting components 38, 39 extends upward from its corresponding battery crossmember 36 that is located below. Each of the load transmitting components 38, 39 is fixed to its corresponding battery crossmember 36 that is located below. Each of the load transmitting components 38, 39 may be integrated with its corresponding battery crossmember 36 that is located below. An upper end of each of the load transmitting components 38, 39 is located higher than the upper surfaces of the battery stacks 42. The load transmitting components 39 are arranged outward of their corresponding load transmitting components 38 in the width direction (at positions farther away from the battery center member 34). In other words, the load transmitting components 38 are disposed between their corresponding load transmitting components 39 and the battery center member 34. As shown in FIG. 6, the upper end of each of the load transmitting components 38, 39 is located in a vicinity of the cover 31. A clearance may be provided between the respective upper ends of the load transmitting components 38, 39 and the cover 31, or the respective upper ends of the load transmitting components 38, 39 may be in contact with the cover 31. Each of the load transmitting components 38, 39 has a tapered shape in which its width in the width direction narrows toward its upper end (more specifically, a trapezoidal shape).

Figure 7:
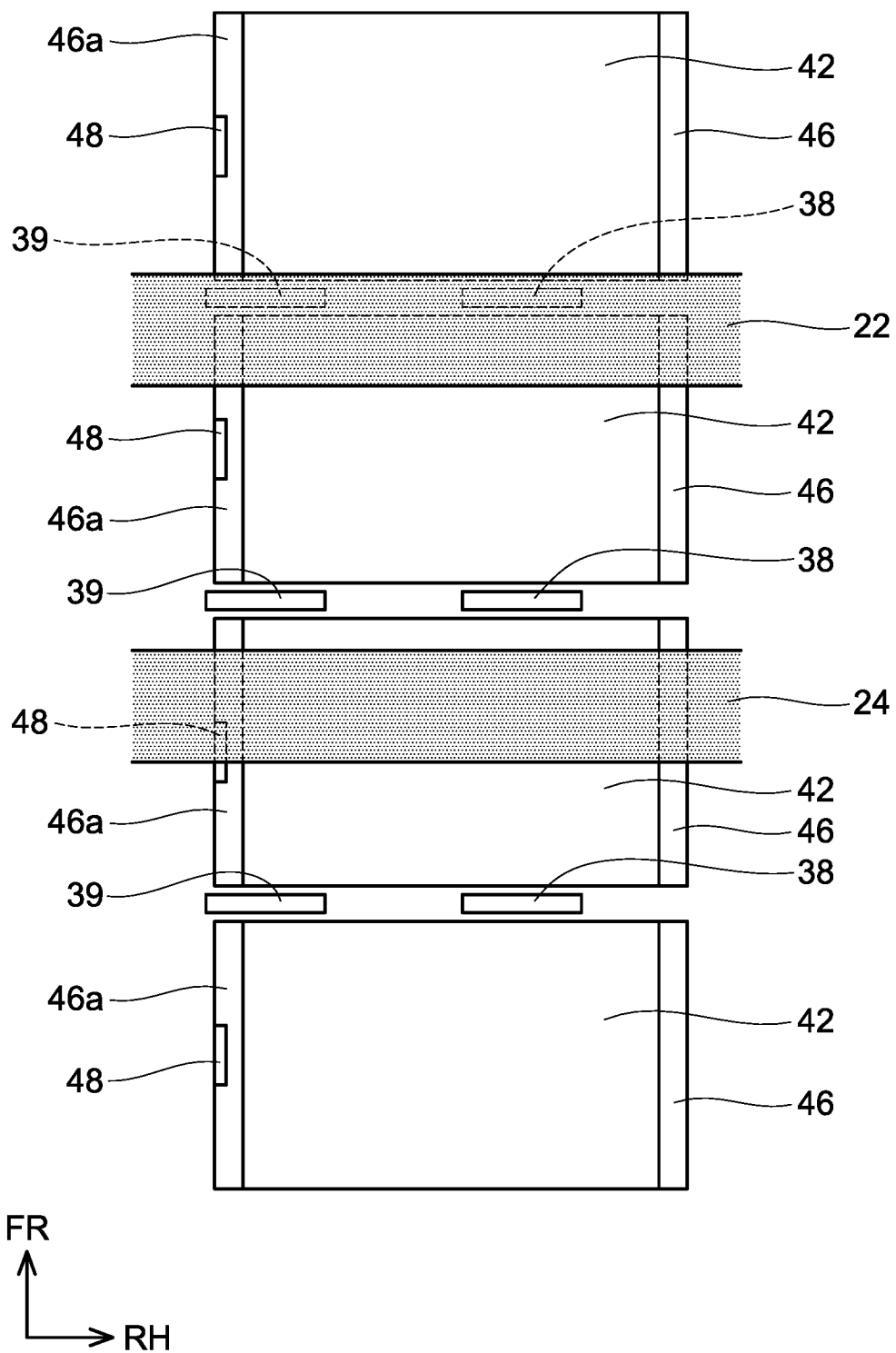
FIG. 7 shows a plan view indicating a positional relationship of the floor crossmembers and load transmitting components.

FIG. 7 shows a positional relationship of the floor crossmembers 22, 24 and the load transmitting components 38, 39, 48 when the floor panel 14 and the battery pack 30 are seen from above. In FIG. 7, the floor crossmembers 22, 24 are indicated by hatching. As shown in FIG. 7, the load transmitting components 38, 39 are disposed below the floor crossmember 22. The load transmitting components 48 are disposed below the floor crossmember 24.

Figure 8:
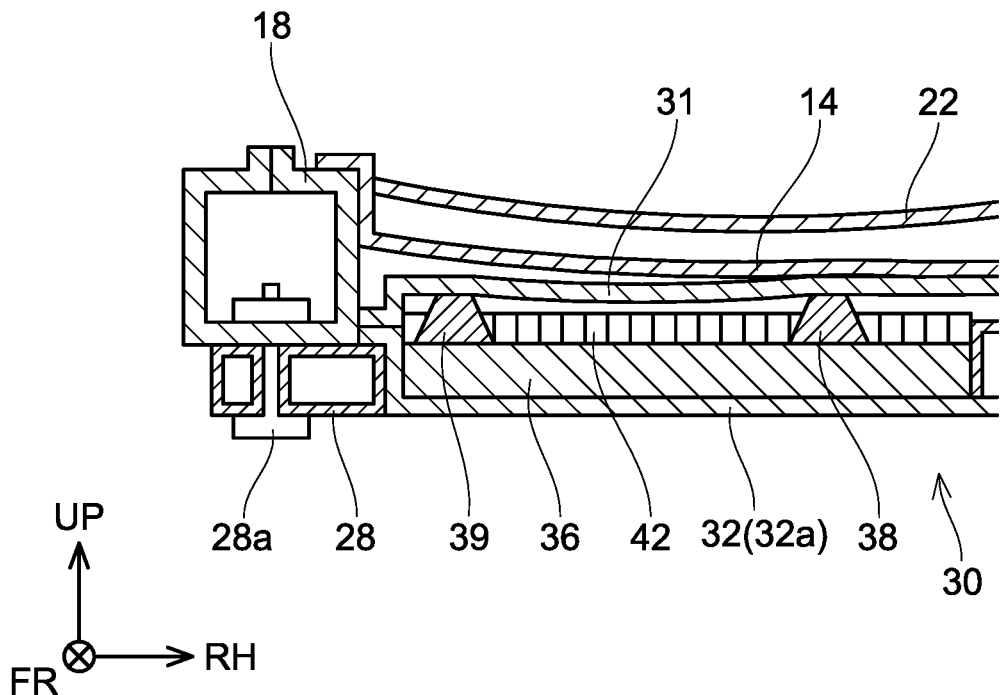
FIG. 8 shows an enlarged cross-sectional view of the battery pack in a case where the floor panel deformed downward.
Figure 9:
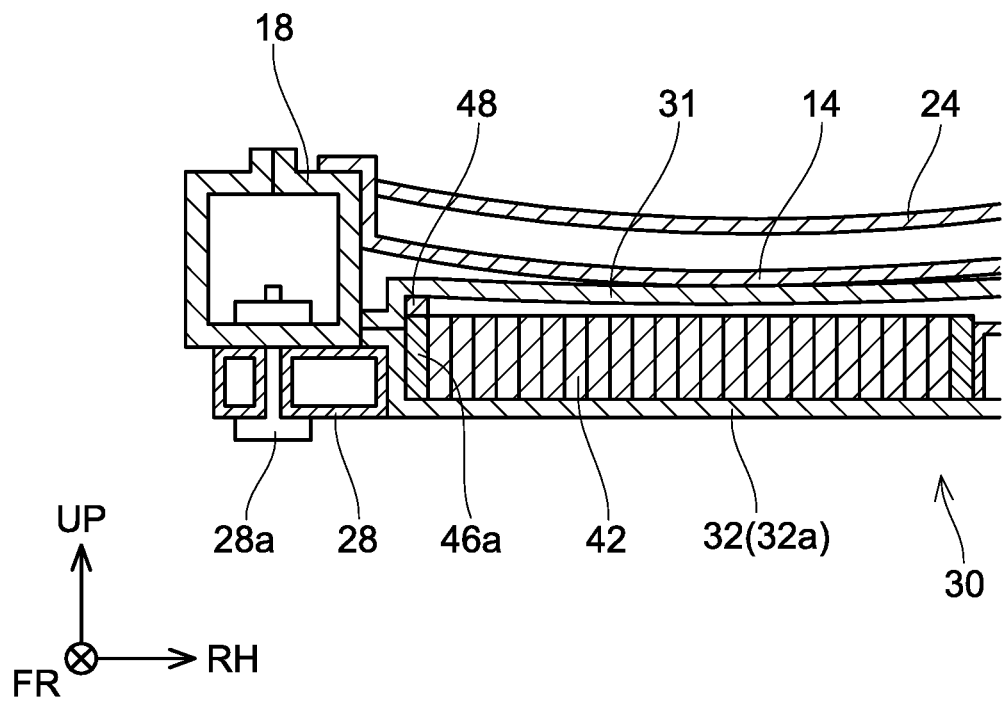
FIG. 9 shows an enlarged cross-sectional view of the battery pack in the case where the floor panel deformed downward.

As shown in FIGS. 8 and 9, there is a case in which the floor panel 14 deforms and warps downward. For example, the floor panel 14 deforms and warps downward when the center pillar 19 shown in FIG. 1 deforms toward the vehicle cabin 12 by lateral collision. As shown in FIGS. 8 and 9, when the floor panel 14 deforms and warps downward, the floor panel 14 comes into contact with the cover 31 and the cover 31 is pressed downward. Since the upper ends of the load transmitting components 38, 39, 48 are located higher than the upper surfaces of the battery stacks 42 within the battery pack 30, the cover 31 pressed downward by the floor panel 14 is supported by the load transmitting components 38, 39, 48. Due to this, the cover 31 is prevented from coming into contact with the battery stacks 42. Loads applied to the load transmitting components 38, 39 from the cover 31 are transmitted to the bottom plate 32a through the battery crossmembers 36. Further, a load applied to the load transmitting components 48 from the cover 31 is transmitted to the bottom plate 32a through the end plates 46a. As such, the loads applied to the load transmitting components 38, 39, 48 are transmitted to the bottom plate 32a that is located below them. Thus, application of a load to the battery stacks 42 can be mitigated. As above, providing the load transmitting components 38, 39, 48 can reduce the load applied to the battery stacks 42. Due to this, breakage of the battery stacks 42 can be prevented upon when the floor panel 14 deforms downward.

As shown in FIGS. 8 and 9, at portions where the floor crossmembers 22, 24 are disposed, the floor panel 14 deforms downward together with the floor crossmembers 22, 24. As such, when the floor panel 14 deforms downward, higher loads is applied to the cover 31 of the battery pack 30 under the floor crossmembers 22, 24. As aforementioned, since the load transmitting components 38, 39 are provided below the floor crossmember 22, the high load can be received by the load transmitting components 38, 39. Further, since the load transmitting components 48 are provided below the floor crossmember 24, the high load can be received by the load transmitting components 48. Thus, the breakage of the battery stacks 42 can be prevented even under the floor crossmembers 22, 24 where the high loads are applied.

Further, as aforementioned, the load transmitting components 38, 39 have the tapered shape in which their widths narrow toward their upper sides. With the load transmitting components 38, 39 having such a shape, the load transmitting components 38, 39 can be prevented from bending when the loads are applied. Thus, the cover 31 can be more securely supported by the load transmitting components 38, 39, and the breakage of the battery stacks 42 can be prevented with more certainty.

Figure 10:
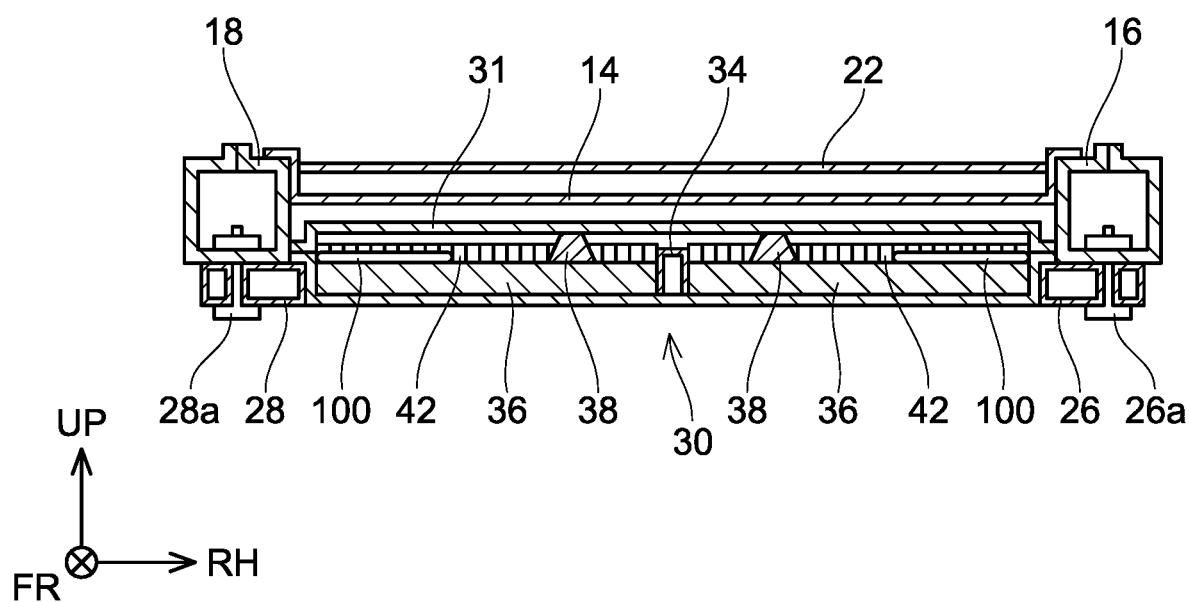
FIG. 10 shows a cross-sectional view of a floor panel and a battery pack along a width direction of an electric vehicle of a variant.

In the aforementioned embodiment, the load transmitting components 39 are provided in the battery pack 30. However, the load transmitting components 39 may not be provided in the battery pack 30. For example, as shown in FIG. 10, there is a case in which wirings 100 connected to the battery stacks 42 are arranged on the battery crossmembers 36, by which the load transmitting components 39 cannot be provided on the battery crossmembers 36. In such a case, the load transmitting components 39 may not be provided. Even when the load transmitting components 39 are not provided, the cover 31 can be supported by the load transmitting components 38 and the load transmitting components 48, and the breakage of the battery stacks 42 can be prevented. As above, so long as the load transmitting components are provided at least at two positions with an interval in the width direction within an area where the battery stacks 42 are present, the load applied to the battery stacks 42 can effectively be reduced.

Further, in the aforementioned embodiment, the load transmitting components 48 are provided in the battery pack 30. However, the load transmitting components 48 may not be provided in the battery pack 30. Even when the load transmitting components 48 are not provided, the cover 31 can be supported by the load transmitting components 38 and the load transmitting components 39, and the breakage of the battery stacks 42 can be prevented. As above, so long as the load transmitting components are provided at least at two positions with an interval in the width direction within the area where the battery stacks 42 are present, the load applied to the battery stacks 42 can effectively be reduced.

Corresponding relationship of the constituent elements of the aforementioned embodiment and the constituent elements recited in the claim will be described below. The end plates 46a of the embodiment are examples of end plates in the claims. The load transmitting components 38 in the embodiment are examples of a first load transmitting component in the claims. The load transmitting components 39, 48 in the embodiment are examples of a second load transmitting component in the claims.

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. An electric vehicle, comprising:
a floor panel; and
a battery pack located below the floor panel, the battery pack including:
a bottom plate;
a plurality of battery stacks distributed on the bottom plate along a longitudinal direction of the electric vehicle with an interval provided between the battery stacks;
a battery crossmember protruding upward from the bottom plate, extending along a width direction of the electric vehicle, and located between the battery stacks;
a plurality of end plates each of which is fixed to an outer side surface of corresponding one of the battery stacks, the outer side surface facing outward in the width direction;
a first load transmitting component extending from the battery crossmember to a position located higher than upper surfaces of the battery stacks; and
a second load transmitting component located outward of the first load transmitting component in the width direction; and
a wiring connected to at least one of the battery stacks,
wherein:
the second load transmitting component is a component extending from the battery crossmember to a position higher than the upper surfaces of the battery stacks or a component extending from at least one of the end plates to a position higher than the upper surfaces of the battery stacks;
the second load transmitting component is the component extending from at least one of the end plates to a position higher than the upper surfaces of the battery stacks, and
the wiring is located on the battery crossmember and outward of the first load transmitting component in the width direction.

2. The electric vehicle of claim 1, further comprising a floor crossmember extending upward from the floor panel and extending along the width direction,
wherein at least one of the first load transmitting component or the second load transmitting component is located below the floor crossmember.

3. The electric vehicle of claim 1, wherein the first load transmitting component comprises a tapered shape in which a width of the first load transmitting component in the width direction narrows toward an upper end of the first load transmitting component.

* * * * *